United States Patent [19]
Ishikawa et al.

[11] Patent Number: 6,053,062
[45] Date of Patent: Apr. 25, 2000

[54] LINEAR MOTION APPARATUS

[75] Inventors: Hirokazu Ishikawa; Takeki Shirai; Tadashi Hirokawa, all of Tokyo-to, Japan

[73] Assignee: THK Co., Ltd., Tokyo-to, Japan

[21] Appl. No.: 08/953,235

[22] Filed: Oct. 17, 1997

[30] Foreign Application Priority Data

Oct. 24, 1996  [JP]  Japan .................................. 8-299268

[51] Int. Cl.$^7$ .......................... F16H 23/22; F16C 29/06
[52] U.S. Cl. .................................. 74/89.15; 74/424.8 A; 74/441; 384/45
[58] Field of Search .......................... 74/89.15, 424.8 R, 74/424.8 A, 441; 384/45

[56] References Cited

U.S. PATENT DOCUMENTS

| | | | |
|---|---|---|---|
| 2,610,519 | 9/1952 | Rokos | 74/441 |
| 4,932,279 | 6/1990 | Kasuga | 74/424.8 R |
| 5,195,391 | 3/1993 | Barbat et al. | 74/89.15 |
| 5,277,498 | 1/1994 | Kawaguchi | 74/89.15 |
| 5,279,175 | 1/1994 | Kasauga et al. | 74/424.8 R |
| 5,299,465 | 4/1994 | Kasuga | 74/89.15 |
| 5,454,278 | 10/1995 | Kasuga | 74/424.8 R |
| 5,755,516 | 5/1998 | Teramachi et al. | 384/45 |

FOREIGN PATENT DOCUMENTS 1-116369  5/1989  Japan .................................. 74/89.15
95/32366  11/1995  WIPO.

*Primary Examiner*—David A. Bucci
*Assistant Examiner*—William C Joyce
*Attorney, Agent, or Firm*—Young & Thompson

[57] ABSTRACT

A linear motion apparatus comprises a linear track rail having a roller running groove; a feeding threaded shaft rotatably arranged in parallel with the track rail; and a movable block arranged on the track rail through rollers, and provided with a nut portion having a threaded bore into which the feeding threaded shaft is to be screwed. The movable block comprises (i) a block body having a roller running counter-groove which faces on the roller running groove of the track rail and a roller returning passage and (ii) direction changing passage forming members respectively provided on both ends of the block body, each of which members forms a U-shaped direction changing passage connecting the roller running counter-groove and the roller returning passage to each other. The movable block is linearly moved on the track rail through the rollers by rotating the feeding threaded shaft. The nut portion is integrally formed on the direction changing passage forming member, and a position of a center axis of the threaded bore of the nut portion is determined by the direction changing passage forming member on a basis of a position of the roller running counter-groove.

9 Claims, 4 Drawing Sheets

LINEAR MOTION APPARATUS

BACKGROUND OF THE INVENTION

1. Field of the Invention

The present invention relates to a linear motion apparatus in which a movable block having a nut portion to which a feeding threaded shaft is screwed, is linearly moved on a track rail by rotating the feeding threaded shaft.

2. Description of the Related Art

In such a kind of conventional linear motion apparatus, a linear track rail and a rotatable feeding threaded shaft are arranged in parallel with each other, and a movable block is movably arranged on the track rail through a large number of rollers.

The movable block is provided with a nut portion having a threaded bore into which the feeding threaded shaft is screwed. The movable block may accordingly be moved on the track rail by the rotation of the feeding threaded shaft.

In the above-described conventional linear motion apparatus, it is difficult to provide a center axis of the threaded bore of the nut portion provided on the movable block that is parallel to a roller running counter-groove of the movable block, although such is needed in order to achieve a smooth movement of the movable block. It is hard to determine an accurate position of the center axis of the threaded bore of the nut portion relative to the roller running counter-groove of the movable block due to the fact that the movable block and the nut portion are separately formed, and there is an inevitable working error in the formation of the movable block and the nut portion. In addition parts may be arranged between them, which make it hard to determine the accurate position of the center axis of the threaded bore of the nut portion relative to the roller running counter-groove of the movable block. It is therefore hard to make accurate machining to form a proper threaded bore in the nut portion in an accurate positional relationship to the roller running counter-groove of the movable block.

SUMMARY OF THE INVENTION

An object of the present invention is therefore to provide a linear motion apparatus which has a simple construction, maintains proper parallelism of the center axis of the threaded bore of the nut portion provided on the movable block to the roller running counter-groove of the movable block, and permits smooth movement of the movable block.

In order to attain the aforementioned object, the linear motion apparatus of the present invention comprises:

a linear track rail having a roller running groove extending linearly;

a feeding threaded shaft rotatably arranged in parallel with said track rail; and a movable block arranged movably on said track rail through a large number of rollers, and provided with a nut portion having a threaded bore into which said feeding threaded shaft is to be screwed;

said movable block comprising (i) a block body having a roller running counter-groove which faces on the roller running groove of said track rail and a roller returning passage arranged away from said roller running counter-groove at a prescribed distance and (ii) a pair of direction changing passage forming members respectively provided on both ends of said block body, each of which members forms a U-shaped direction changing passage connecting said roller running counter-groove and said roller returning passage to each other;

said movable block being linearly moved on said track rail through said rollers by rotating said feeding threaded shaft;

characterized in that:

said nut portion is integrally formed on at least one of said direction changing passage forming members, and a position of a center axis of the threaded bore of said nut portion is determined by said at least one of said direction changing passage forming members on the basis of a position of said roller running counter-groove.

According to the above-described feature of the present invention, it is possible to achieve the accurate parallelism of the center axis of the threaded bore of the nut portion provided on the movable block to the roller running counter-groove of the movable block, since the position of the center axis of the threaded bore of the nut portion is directly determined by the direction changing passage forming member on the basis of the position of the roller running counter-groove.

The above-mentioned direction changing passage forming member may comprise an inner member forming an inner guide surface for the direction changing passage and an outer member forming an outer guide surface for the direction changing passage, and the nut portion may integrally be formed on the inner member. According to this feature, the position of the center axis of the threaded bore of the nut portion can more accurately be determined relative to the roller running counter-groove, since the abovementioned inner member is continuously connected with the end of the block body of the movable block, which has the roller running counter-groove.

The above-mentioned inner member of the direction changing passage forming member and the nut portion may integrally be formed on the block body by means of an insert forming method in which the position of the block body is determined on the basis of the position of the roller running counter-groove in a die and the die is filled with a forming material. The integral forming of the inner member and the nut portion with the block body makes it possible to determine an accurate positional relationship between the roller running counter-groove of the block body and the nut portion. More specifically, the inner member is firmly secured to the block body having rigidity, and the position of the inner member is stationarily secured. As a result, the inner member can accurately be formed on the block body as designed on the basis of the position of the roller running counter-groove, and the nut portion integrally formed with the inner member can also be formed accurately in parallel with the roller running counter-groove.

The above-mentioned direction changing passage forming member may comprise an inner member forming an inner guide surface for the direction changing passage and an outer member forming an outer guide surface for the direction changing passage, and the nut portion may integrally be formed on the outer member. According to this feature, the position of the center axis of the threaded bore of the nut portion can more accurately be determined relative to the roller running counter-groove, since the position of the above-mentioned outer member is determined relative to the roller running counter-groove of the block body.

The above-mentioned nut portion preferably has a slit formed thereon which divides the nut portion into two parts, and phases of female threaded portions of the divided parts thereof deviates from each other. According to this feature, it is possible to decrease backlash between the feeding threaded shaft and the nut portion, thus permitting the accurate and precise movement of the movable block.

A distance adjusting mechanism for causing the phases of the female threaded portions of the above-mentioned divided parts of the nut portion to deviate from each other may be provided between the divided parts thereof. According to this feature, it is possible to impart a larger pre-load between the feeding threaded shaft and the nut portion.

DETAILED DESCRIPTION OF THE PREFERRED EMBODIMENTS

Figure 1:
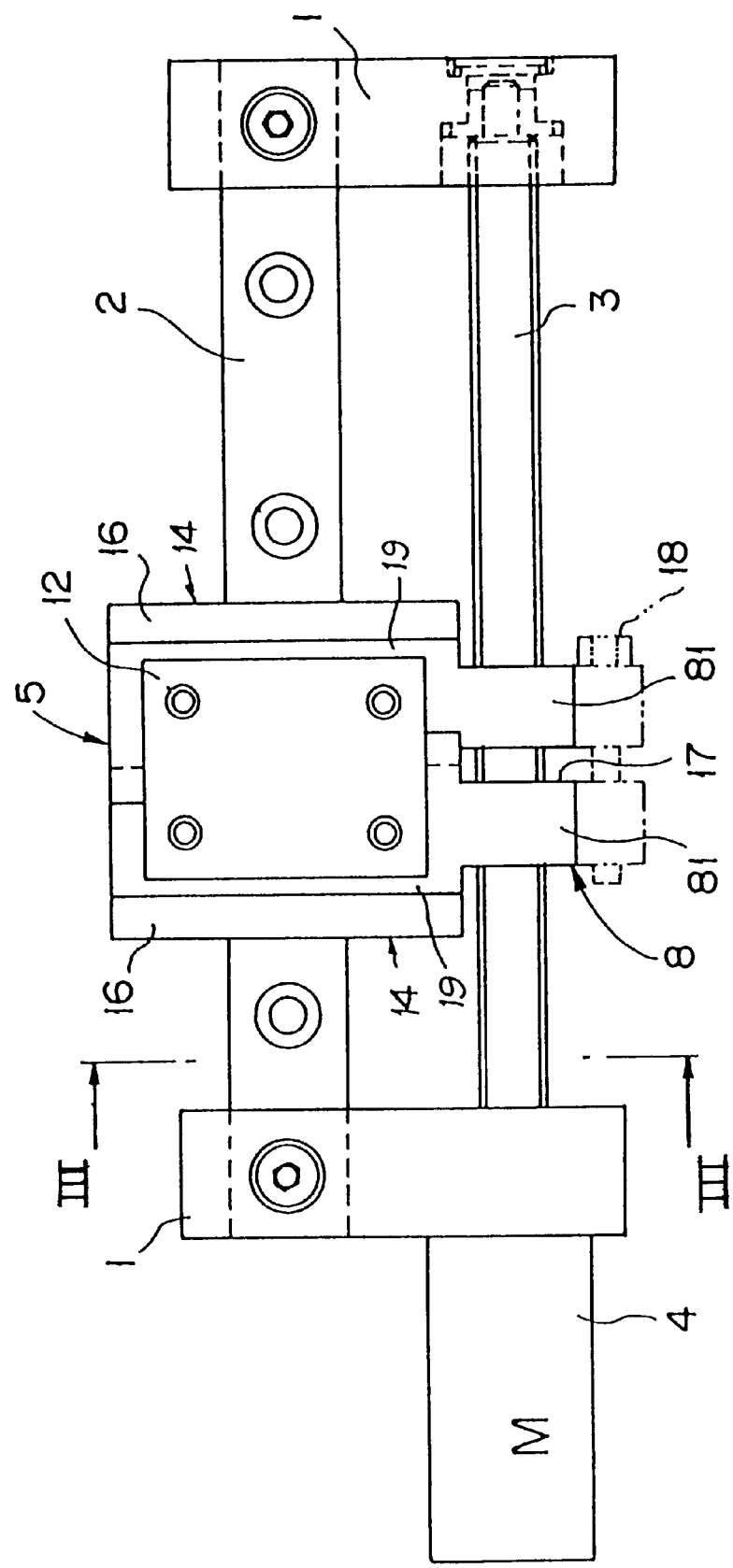
FIG. 1 is a plan view illustrating a linear motion apparatus of the first embodiment of the present invention.
Figure 2:
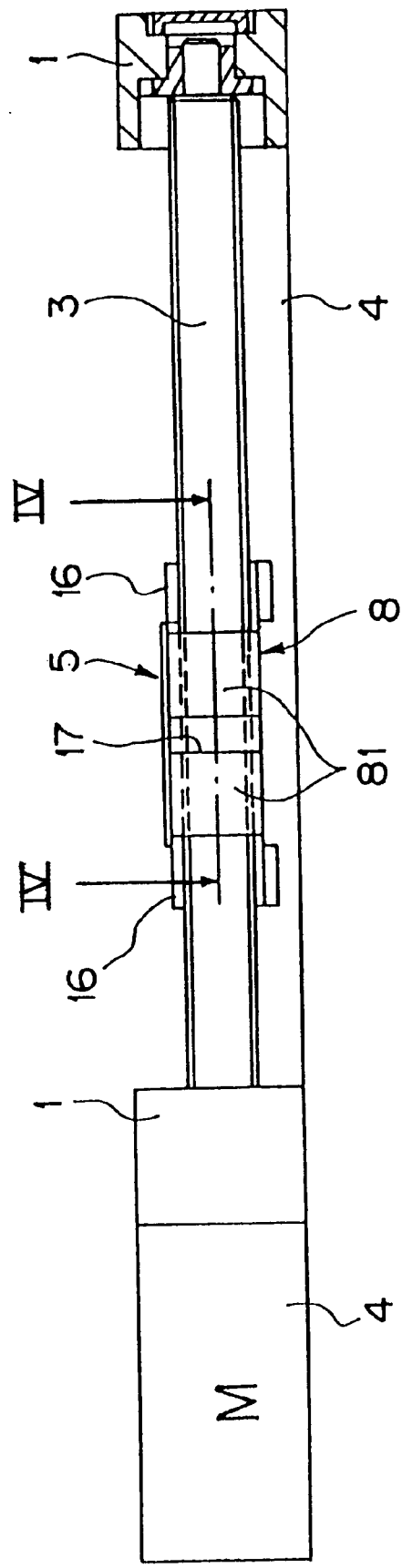
FIG. 2 is a front view of the linear motion apparatus as shown in FIG.1.
Figure 3:
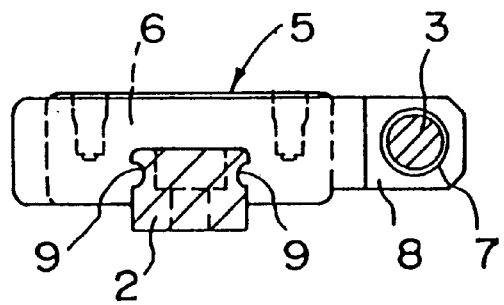
FIG. 3 is a cross sectional view cut along an III—III line in FIG. 1.
Figure 4:
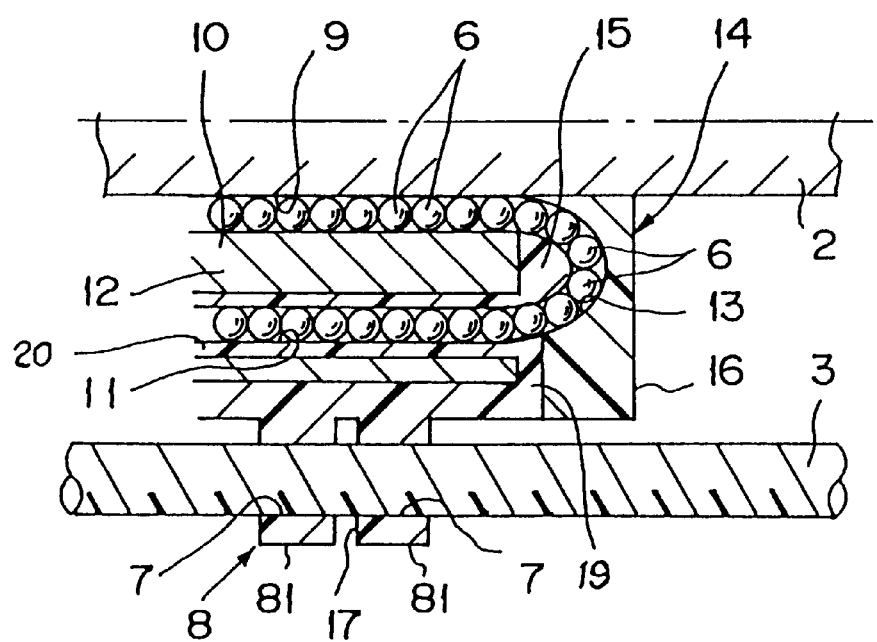
FIG. 4 is a cross sectional view cut along a IV—IV line in FIG. 2.

Now, the embodiments of the present invention as shown in the figures will be described in detail.

FIGS. 1 to 4 illustrate the linear motion apparatus of the first embodiment of the present invention.

A linear track rail 2 and a feeding threaded shaft 3 are arranged in parallel with each other between a pair of housings 1. The feeding threaded shaft 3 can be rotated by means of a driving motor 4. A movable block 5 is arranged on the track rail 2 through a large number of rollers 6 such as balls so as to be linearly movable.

The movable block 5 is provided with a nut portion 8 having a threaded bore into which the above-mentioned feeding threaded shaft 3 is to be screwed.

The track rail 2 is provided with a pair of roller running grooves 9 which extend linearly.

The movable block 5 comprises a block body 12 and a pair of direction changing passage forming members 14. The block body 12 has a roller running counter-groove 10 which faces on the roller running groove 9 of the track rail 2 and a roller returning passage 11 arranged away from the roller running counter-groove 10 at a prescribed distance. The direction changing passage forming members 14 are respectively provided on both ends of the block body 12. Each of the direction changing passage forming members 14 forms a U-shaped direction changing passage 13 which connects the roller running counter-groove 10 and the roller returning passage 11 to each other.

The above-mentioned nut portion 8 is integrally formed on the direction changing passage forming member 14. The position of the center axis of the threaded bore 7 of the nut portion 8 is determined by the direction changing passage forming member 14 on the basis of the position of the roller running counter-groove 10.

More specifically, the direction changing passage forming member 14 comprises an inner member 15 made of synthetic resin, which forms an inner guide surface 13a for the U-shaped direction changing passage 13 and a side plate 16 made of synthetic resin as an outer member which forms an outer guide surface 13b for the direction changing passage 13. In the first embodiment of the present invention, the nut portion 8 is integrally formed on the above-mentioned inner member 15.

The position of the center axis of the threaded bore 7 of the nut portion 8 is directly determined by the inner member 15 of the direction changing passage forming member 14 on the basis of the position of the roller running counter-groove 10 in this manner. The inner member 15 is continuously connected with the end of the block body 12 of the movable block 5, which has the roller running counter-groove 10. It is therefore possible to achieve the accurate parallelism of the center axis of the threaded bore 7 of the nut portion 8 to the roller running counter-groove 10 of the movable block 5. The above-mentioned construction improves the parallelism of the center axis of the threaded bore 7 of the nut portion 8 to the roller running counter-groove 10 of the movable block 5. Even if there is any working error in the parallelism of the center axis of the threaded bore 7 of the nut portion 8 to the roller running counter-groove 10 of the movable block 5 and/or in the parallelism of the track rail 2 to the feeding threaded shaft 3, the inner member 15 and the nut portion 8 integrally formed thereto, both of which are made of synthetic resin, may absorb such a working error.

In addition, in the first embodiment of the present invention, the inner member 15 of the direction changing passage forming member 14 and the nut portion 8 are integrally formed on the block body 12 by means of an insert forming method in which the position of the block body 12 is determined on the basis of the position of the roller running counter-groove 10 in a die and the die is filled with synthetic resin as a forming material. In this embodiment, the nut portion 8 is arranged on one side, i.e., the feeding threaded shaft-side of the block body 12, and each of both end surfaces of the block body 12 is covered with the inner member 15 and a synthetic resin-formed portion 19 integrally formed therewith, both of which are also integrally formed with the nut portion 8. Further, the inner surface of the roller returning passage 11 of the block body 12 is covered with a synthetic resin-formed portion 20 which is integrally formed with the inner member 15 and the synthetic resin-formed portion 19.

When the inner member 15 and the nut portion 8 are integrally formed with the block body 12 in this manner, it is possible to determine an accurate positional relationship between the roller running counter-groove 10 of the block body 12 and the nut portion 8. More specifically, the inner member 15 is firmly secured to the block body 12 having a high rigidity, and the position of the inner member 15 is stationarily secured. As a result, the inner member 15 can accurately be formed on the block body 12 as designed on the basis of the position of the roller running counter-groove 10, and the nut portion 8 integrally formed with the inner member 15 can also be formed accurately in parallel with the roller running counter-groove 10.

In addition, the nut portion 8 has a slit 17 formed thereon which divides the nut portion 8 into two parts, and phases of female threaded portions of the divided parts 81, 81 thereof deviates from each other.

According to this construction, a low pressure pre-load is imparted to the feeding threaded shaft 3 by the restoring force caused by elasticity of the divided parts 81, 81 of the nut portion 8, and it is therefore possible to decrease backlash between the feeding threaded shaft 3 and the nut portion 8, thus permitting the accurate and precise movement of the movable block 5.

When a distance adjusting mechanism 18 such as an adjusting screw for causing the phases of the female threaded portions of the divided parts 81, 81 of the nut portion 8 to deviate from each other is provided between the divided parts 81, 81 thereof as shown in a chain double-dashed line in FIG. 1, it is possible to impart a larger pre-load between the feeding threaded shaft 3 and the nut portion 8.

Figure 5:
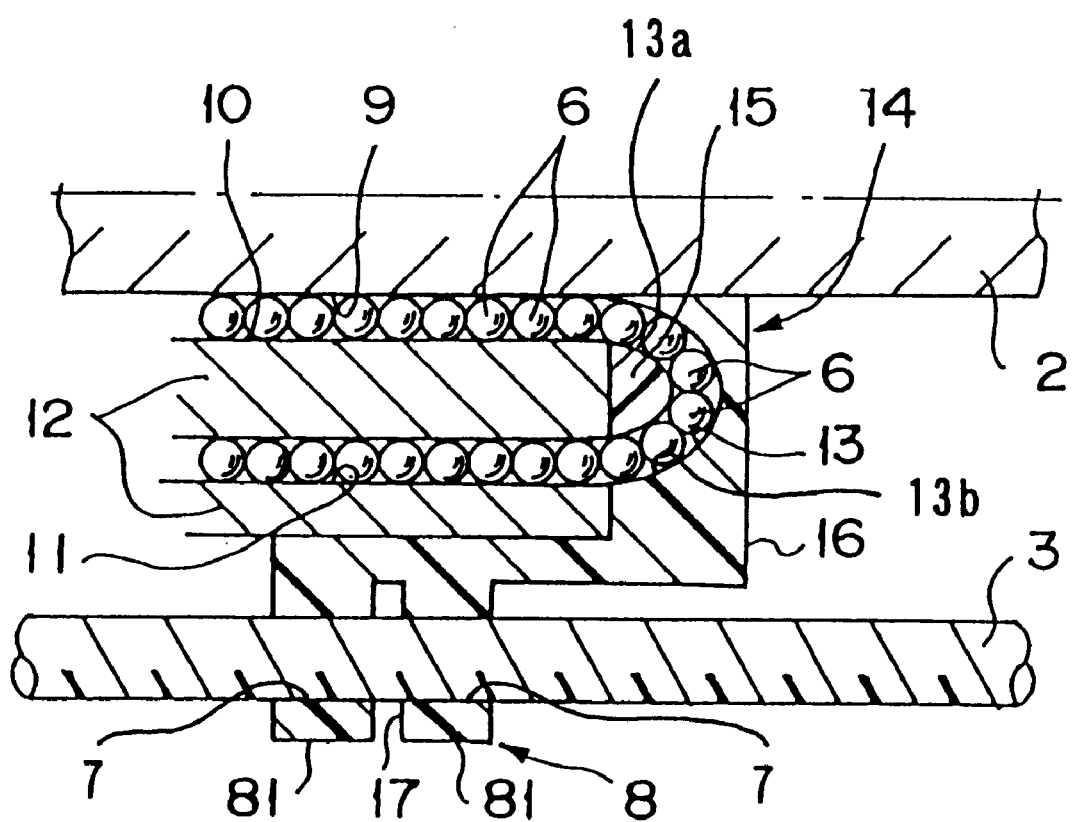
FIG. 5 is a cross sectional view illustrating a linear motion apparatus of the second embodiment of the present invention.

The linear motion apparatus of the second embodiment of the present invention will be described with reference to FIG. 5.

In the second embodiment of the present invention, the nut portion 8 is integrally formed with the side plate 16 as an outer member, although the nut portion 8 is integrally formed with the inner member 15 of the direction changing passage forming member 14 in the first embodiment of the present invention.

The position of the side plate 16 as an outer member is determined relative to the roller running counter-groove 10 of the block body 12. Therefore, the position of the center axis of the threaded bore 7 of the nut portion 8 can more accurately be determined relative to the roller running counter-groove 10.

This aspect will be explained in detail below. The inner member 15 composing a part of the direction changing passage forming member 14 is integrally formed with the block body 12 on the basis of the position of the roller running counter groove 10 of the block body 12. The block body 12 has so high rigidity as to make substantially no deformation thereof, and as a result, the position of the inner member 15 firmly secured to the block body 12 is stationarily secured. When the inner members 15 respectively arranged on the both ends of the block body 12 are integrally connected with each other along the axial direction of the block body 12 by means of synthetic resinformed portions (not shown) with which the upper and side surfaces of the block body 12 and the inner circumferential surface of the roller returning passage 11 are covered, the inner members 15 are bound with the abovementioned synthetic resin-formed portions, thus making it possible to firmly secure the inner members 15 to the block body 12.

The side plate 16 is on the other hand formed as an outer guide portion for the direction changing passage 13 at the same time that a female thread forming is conducted to form a threaded bore 7 in the nut portion 8. As a result, the threaded bore 7 having its axial line as designed can be formed in the nut portion 8, and the outer guide surface 13b of the side plate 16 can also be formed as designed.

The direction changing passage 13 is formed by causing the inner guide surface 13a of the inner member 15 formed on the end surface of the block body 12 to face on the outer guide surface 13b of the side plate 16. The both ends of the thus formed direction changing passage 13 are connected with the roller running counter-groove 10 and the roller returning passage 11, respectively so as to maintain proper alignment thereof The smooth continuity of the direction changing passage 13, the roller running counter-groove 10 and the roller returning passage 11 is secured, thus permitting the smooth circulation of the rollers 6.

The inner member 15 and the side plate 16 as an outer member are formed so as to cause the inner guide surface 13a of the former to face on the outer guide surface 13b of the latter to form the direction changing passage 13. Here, the side plate 16 is stationarily secured relative to the side surface of the block body 12, and the nut portion 8 is integrally formed with the side plate 16. It is therefore possible to accurately determine the position of the center axis of the threaded bore 7 of the nut portion 8 relative to the roller running counter-groove 10 of the block body 12, thus maintaining the proper parallelism of the center axis of the threaded bore 7 of the nut portion 8 to the roller running counter-groove 10 of the block body 12.

In the above-described second embodiment of the present invention, the nut portion 8 is integrally formed with one of the pair of side plates 16, 16. Two nut portions 8, 8 may however be formed integrally with the both side plates 16, 16, respectively. In such a case, it is not necessary to form a slit for imparting pre-load to the feeding threaded shaft 3 on the nut portion unlike the first and second embodiments of the present invention.

According to the present invention as described in detail, it is possible to achieve the accurate parallelism of the center axis of the threaded bore of the nut portion provided on the movable block to the roller running counter-groove of the movable block, since the position of the center axis of the threaded bore of the nut portion is directly determined by the direction changing passage forming member on the basis of the position of the roller running counter-groove.

When the nut portion is integrally formed on the inner member of the direction changing passage forming member, the position of the center axis of the threaded bore of the nut portion can more accurately be determined relative to the roller running counter-groove, since the above-mentioned inner member is continuously connected with the end of the block body of the movable block, which has the roller running counter-groove.

When the above-mentioned inner member of the direction changing passage forming member and the nut portion are integrally formed on the block body by means of the insert forming method in which the position of the block body is determined on the basis of the position of the roller running counter-groove in a die and the die is filled with a forming material, it is possible to determine an accurate positional relationship between the roller running counter-groove of the block body and the nut portion.

When the nut portion is integrally formed on the outer member of the direction changing passage forming member, the position of the center axis of the threaded bore of the nut portion can more accurately be determined relative to the roller running counter-groove, since the position of the abovementioned outer member is determined relative to the roller running counter-groove of the block body.

When the above-mentioned nut portion has a slit formed thereon which divides the nut portion into two parts, and phases of female threaded portions of the divided parts thereof deviates from each other, it is possible to decrease backlash between the feeding threaded shaft and the nut portion, thus permitting the accurate and precise movement of the movable block.

When a distance adjusting mechanism for causing the phases of the female threaded portions of the abovementioned divided parts of the nut portion to deviate from each other is provided between the divided parts thereof, it is possible to impart a larger pre-load between the feeding threaded shaft and the nut portion.

What is claimed is:

1. A linear motion apparatus, which comprises:

a linear track rail having a roller running groove extending linearly;

a feeding threaded shaft rotatable arranged in parallel with said track rail; and a movable block arranged movably on said track rail through a plurality of rollers, and provided with a nut portion having a threaded bore into which said feeding thread shaft is to be screwed;

said movable block comprising (i) a block body having a roller running counter-groove which faces on the roller running groove of said track rail and a roller returning passage arranged away from said roller running counter-groove at a prescribed distance and (ii) a direction changing passage forming member at each end of said block body, each of which members forms a U-shaped direction changing passage connecting said roller running counter-groove and said roller returning passage to each other;

said movable block being linearly moved on said track rail through said rollers by rotating said feeding threaded shaft; and said nut portion being integrally formed with at least one of said direction changing passage forming members, and a position of a center axis of the threaded bore of said nut portion being determined by said at least one of said direction changing passage forming members on a basis of a position of said roller running counter-groove, wherein;
said direction changing passage forming members comprise an inner member forming an inner guide surface for said direction changing passage and an outer member forming an outer guide surface for said direction changing passage, and said nut portion is integrally formed with said outer member.

2. A linear motion apparatus, which comprises:

a linear track rail having a roller running groove extending linearly;

a feeding threaded shaft rotatable arranged in parallel with said track rail; and a movable block arranged movably on said track rail through a plurality of rollers, and provided with a nut portion having a threaded bore into which said feeding threaded shaft is to be screwed;

said movable block comprising (i) a block body having a roller running counter-groove which faces on the roller running groove of said track rail and a roller returning passage arranged away from said roller running counter-groove at a prescribed distance and (ii) a direction changing passage forming member at each end of said block body, each of which members forms a U-shaped direction changing passage connecting said roller running counter-groove and said roller returning passage to each other;

said movable block being linearly moved on said track rail through said rollers by rotating said feeding threaded shaft; and said nut portion being integrally formed with at least one of said direction changing passage forming members, and a position of a center axis of the threaded bore of said nut portion being determined by said at least one of said direction changing passage forming members on a basis of a position of said roller running counter-groove, wherein;
said nut portion has a slit formed thereon which divides said nut portion into two parts, and phases of female threaded portions of the divided parts thereof deviates from each other.

3. A linear motion apparatus as claimed in claim 2, wherein:

a distance adjusting mechanism for causing the phases of the female threaded portions of said divided parts of said nut portion to deviate from each other is provided between said divided parts thereof.

4. A linear motion apparatus, which comprises:

a linear track rail having a roller running groove extending linearly;

a feeding threaded shaft rotatable arranged in parallel with said track rail; and a movable block arranged movably on said track rail through a plurality of rollers, and provided with a nut portion having a threaded bore into which said feeding threaded shaft is to be screwed;

said movable block comprising (i) a block body having a roller running counter-groove which faces on the roller running groove of said track rail and a roller returning passage arranged away from said roller running counter-groove at a prescribed distance and (ii) a direction changing passage forming member at each end of said block body, each of which members forms a U-shaped direction changing passage connecting said roller running counter-groove and said roller returning passage to each other;

said movable block being linearly moved on said track rail through said rollers by rotating said feeding threaded shaft; and said nut portion being integrally formed with at least one of said direction changing passage forming members, and a position of a center axis of the threaded bore of said nut portion being determined by said at least one of said direction changing passage forming members on a basis of a position of said roller turning counter-groove, wherein:
said direction changing passage forming members comprise an inner member forming an inner guide surface for said direction changing passage and an outer member forming an outer guide surface for said direction changing passage, and said nut portion is integrally formed with said inner member; and said nut portion has a slit formed thereon which divides said nut portion into two parts, and phases of female threaded portions of the divided parts thereof deviates from each other.

5. A linear motion apparatus as claimed in claim 4, wherein:

a distance adjusting mechanism for causing the phases of the female threaded portions of said divided parts of said nut portion to deviate from each other is provided between said divided parts thereof.

6. A linear motion apparatus, which comprises:

a linear track rail having a roller running groove extending linearly;

a feeding threaded shaft rotatably arranged in parallel with said track rail; and a movable block arranged movably on said track rail through a plurality of rollers, and provided with a nut portion having a threaded bore into which said feeding threaded shaft is to be screwed;

said movable block comprising (i) a block body having a roller running counter-groove which faces on the roller running groove of said track rail and a roller returning passage arranged away from said roller running counter-groove at a prescribed distance and (ii) a direction changing passage forming member at each end of said block body, each of which members forms a U-shaped direction changing passage connecting said roller running counter-groove and said roller returning passage to each other;

said movable block being linearly moved on said track rail through said rollers by rotating said feeding threaded shaft; and said nut portion being integrally formed with at least one of said direction changing passage forming members, and a position of a center axis of the threaded bore of said nut portion being determined by said at least one of said direction changing passage forming members on a basis of a position of said roller running counter-groove, wherein:

said direction changing passage forming members comprise an inner member forming an inner guide surface for said direction changing passage and an outer member forming an outer guide surface for said direction changing passage, and said nut portion is integrally formed with said inner member;

said inner member of said direction changing passage forming member and said nut portion are integrally formed with said block body by means of an insert forming method in which a position of said block body is determined on a basis of a position of said roller running counter-groove in a die and the die is filled with a forming material; and said nut portion has a slit formed thereon which divides said nut portion into two parts, and phases of female threaded portions of the divided parts thereof deviates from each other.

7. A linear motion apparatus as claimed in claim 6, wherein:

a distance adjusting mechanism for causing the phases of the female threaded portions of said divided parts of said nut portion to deviate from each other is provided between said divided parts thereof.

8. A linear guide comprising:

a linear track rail having a roller running groove therein;

a rotatable threaded shaft parallel to said rail;

a block movable on said rail and comprising a roller running counter-groove facing said roller running groove and a return passage spaced from said counter-groove; and a direction changing passage forming member attached to said block at each end of said counter-groove, each said direction changing passage forming member comprising an inner member that is an inner guide surface of a U-shaped direction changing passage that connects said counter-groove to said return passage and an outer member separate from said inner member that is an outer guide surface of the direction changing passage, one said direction changing passage forming member further comprising a nut portion having a threaded bore into which said shaft is rotatably inserted so that when said shaft is rotated said block moves on said rail, said nut portion being integrally formed with said inner member with an insert forming method that attaches said nut portion to said block.

9. A linear guide comprising:

a linear track rail having a roller running groove therein;

a rotatable threaded shaft parallel to said rail;

a block movable on said rail and comprising a roller running counter-groove facing said roller running groove and a return passage spaced from said counter-groove; and a direction changing passage forming member attached to said block at each end of said counter-groove, each said direction changing passage forming member comprising an inner member that is an inner guide surface of a U-shaped direction changing passage that connects said counter-groove to said return passage and an outer member separate from said inner member that is an outer guide surface of the direction changing passage, one said direction changing passage forming member further comprising a nut portion having a threaded bore into which said shaft is rotatably inserted so that when said shaft is rotated said block moves on said rail, said nut portion being integrally formed with one of said inner and outer members and being divided into two parts by a split therein, wherein phases of threaded portions of said threaded bore of said divided parts deviate from each other.

* * * * *